US010634790B2

(12) United States Patent
Mullen et al.

(10) Patent No.: US 10,634,790 B2
(45) Date of Patent: Apr. 28, 2020

(54) DIGITAL PASSBAND PROCESSING OF WIDEBAND MODULATED OPTICAL SIGNALS FOR ENHANCED IMAGING

(71) Applicants: Linda Mullen, Chesapeake Beach, MD (US); Robert Lee, Washington, DC (US); Justin Nash, Leonardtown, MD (US); Brandon Cochenour, Alexandria, VA (US)

(72) Inventors: Linda Mullen, Chesapeake Beach, MD (US); Robert Lee, Washington, DC (US); Justin Nash, Leonardtown, MD (US); Brandon Cochenour, Alexandria, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 210 days.

(21) Appl. No.: 15/405,993

(22) Filed: Jan. 13, 2017

(65) Prior Publication Data

US 2018/0203121 A1    Jul. 19, 2018

(51) Int. Cl.
*G01S 17/89* (2006.01)
*G01S 17/10* (2006.01)
*H04B 10/50* (2013.01)

(52) U.S. Cl.
CPC .......... *G01S 17/89* (2013.01); *G01S 17/102* (2013.01); *H04B 10/5057* (2013.01)

(58) Field of Classification Search
CPC .... G01S 17/89; G01S 17/102; H04B 10/5057
USPC ...................................................... 356/4.01
See application file for complete search history.

(56) References Cited

U.S. PATENT DOCUMENTS 5,822,047 A    10/1998    Contarino et al.

FOREIGN PATENT DOCUMENTS

WO    PCT/EP2014/072789    4/2015

OTHER PUBLICATIONS

Luchinin, "Complex modulation of airborne lidar light pulse: the effects of rough sea surface and multiple scattering", Proc. SPIE 8532, Remote Sensing of the Ocean, Sea Ice, Coastal Waters, and Large Water Regions 2012, 85320R, Oct. 19, 2012.
Mullen, et al, "Digital passband processing of wideband-modulated optical signals for enhanced underwater imaging", Journal Optical Society of America, Nov. 1, 2016, vol. 55, No. 31.

*Primary Examiner* — Daniel L Murphy
(74) *Attorney, Agent, or Firm* — Olivia R. Scheuer; NAWCAD

(57) ABSTRACT

An optical imaging system and method for use in a degraded visual environment is provided. A wideband modulated laser pulse is transmitted from a first location through a medium toward a target object. An input of the transmitted wideband modulated laser pulse is detected by an optical receiver. A target modulated laser pulse, reflected from the target object is detected by the optical receiver. The transmitted and reflected laser pulses are filtered by a bandpass filter, based on a predetermined modulated frequency range. The filtered transmitted and reflected laser pulses are digitized by an analog-digital converter. The digitized transmitted laser pulse is correlated with digitized reflected laser pulse by a digital matched filter, wherein the matched filter produces a passband matched filter output. A range of the target object is determined based on the matched filter output.

9 Claims, 4 Drawing Sheets

DIGITAL PASSBAND PROCESSING OF WIDEBAND MODULATED OPTICAL SIGNALS FOR ENHANCED IMAGING

STATEMENT OF GOVERNMENT INTEREST

The invention described herein may be manufactured, licensed, and used by or for the Government of the United States of America for governmental purposes without payment of any royalties thereon or therefor.

BACKGROUND

Laser systems are used for active imaging in degraded visual environments. These systems transmit a laser pulse that is reflected off a target object in the environment, which is then received by an optical detector. The detected laser reflection is processed, either through digital or analog processing, to create an image of the target object. Conventional laser imaging systems suffer from degraded visuals due to the collection of scattered light. The collection of scattered light is the result of multiple sources. First, some light is scattered in the backward direction and never reaches the object of interest. This backscattered light decreases image contrast and increases the noise level at the receiver. Second, light scatters at small angles on its path to the object, the once collimated laser beam becomes spatially dispersed and illuminates parts of the object outside of the area of interest. The small angle light scatter is termed 'blur-glow scatter' since it causes image blurring and loss of spatial resolution. Last, forward-scattered light can reach object features—and/or the background—that may be at different ranges. The collection of each of these light scatter sources can cause each illuminated pixel to contain contributions from other parts of the object. Where systems cannot resolve the returns at different ranges, errors in range estimations can occur.

Light that is backscattered on its path to the target object can be significantly reduced by using a pulsed laser (1-2 ns pulse width) and a high speed, range-gated receiver. In some instances, the receiver can be timed to 'open' at a time corresponding to the roundtrip delay to the object. Therefore, the receiver is 'closed' when the early-arriving backscattered signal appears at the receiver and is suppressed. However, the system is blind to objects that are located outside of the gate 'on' time, which could lead to error. Furthermore, gating can cause a highly sensitive photo receiver to suffer from ringing due to impedance mismatches.

An approach that combines radar modulation, demodulation, and signal processing schemes with a pulsed time of flight laser system was developed as an alternate to the conventional short pulse approach. This technique uses a high speed (>100 MHz) narrowband-modulated 20-30 ns laser pulse and a high speed, matched filter receiver. The signal reflected from an object retains its modulation and can be recovered at the receiver. By bandpass filtering the detected signal at the modulation frequency, the backscatter is suppressed and the object-reflected signal is enhanced.

Multiple forward scattering causes a short optical pulse to be stretched in time. Since the range resolution is directly proportional to the laser pulse width, temporal stretching due to scattering reduces the achievable range resolution. Small angle multiple scattering becomes uncorrelated with the initial pulse, allowing the narrowband modulated pulse approach to filter out forward-scattered light. However, in some cases, the range resolution is not sufficient to distinguish between two, closely spaced objects or different range features of a three dimensional object. Furthermore, if the object dimensions are on the same order as the wavelength of the modulation signal, returns from different parts of the object can constructively and destructively interfere which introduces distortions in the collected imagery. Despite the breadth of advances made in optical imaging of degraded visual environments, image quality remains an issue.

SUMMARY

In general, in one aspect, a method of imaging in a degraded visual environment includes transmitting a wideband modulated laser pulse from a first location, through a medium, toward a target object at a second location, detecting a reference input of the transmitted wideband modulated laser pulse by an optical receiver, detecting a modulated laser pulse reflected from the target object with the optical detector, filtering the target-reflected modulated laser pulse and the reference input with a bandpass filter based on a predetermined modulation frequency range, digitizing the filtered target-reflected modulated laser pulse and filtered reference input with an analog-digital converter, correlating the digitized filtered target-reflected modulated laser pulse and digitized filtered reference input with a digital matched filter, wherein the matched filter produces a passband matched filter output; and determining a range of the target object based on the matched filter output.

In general, in another aspect, an apparatus for imaging in a degraded visual environment includes a laser, positioned to transmit a wideband modulated pulse toward a target object located within a degraded visual environment; an optical receiver, positioned to receive one or more return pulses; a bandpass filter, positioned in line with the optical receiver, wherein the bandpass filter rejects a portion of the one or more return pulses outside a threshold modulation frequency range; an analog-digital converter, positioned in line with the bandpass filter, wherein the wideband modulated pulse and one or more return pulses are converted to a plurality of digital signals; and a digital matched filter arranged to receive the plurality of digital signals.

Unless otherwise defined, all technical and scientific terms used herein have the same meaning as commonly understood by one of ordinary skill in the art to which this invention belongs. Other features and advantages will be apparent from the following detailed description.

DRAWINGS

These and other features, aspects and advantages of the present invention will become better understood with reference to the following description and appended claims, and accompanying drawings wherein:

DETAILED DESCRIPTION

Current limitations in imaging of degraded visual environments cause resulting images to be of low quality and often lack contrast and resolution (in both space and range). As a result, difficulties exist in resolving a single object among multiple objects, specific areas of a single object, and exact boundaries of an object. Embodiments of the present invention recognize a need for high contrast and resolution image processing for imaging in degraded visual environments. Many variables in the degraded visual environment imaging process affect the image quality, including backscatter, blur glow, laser wavelength, and pulse frequency. Embodiments of the current invention overcome many of the image quality limitations. In response, images produced using the current invention have improved image quality. Some example degraded visual environments include, but are not limited to, turbid water, fog, clouds, and dust.

Further, the limitations of short pulse methods due to pulse spreading in the degraded visual environments limit current systems. The proposed method uses the output of a matched filter to produce pulse compression, which results in the pulse duration being inversely proportional to the bandwidth of the signal. This method is also largely unaffected by the effects of the degraded visual environment. Thus, wideband modulation and subsequent matched filter processing provides a way to obtain a high time (or range) resolution range measurement by using a wider transmitted pulse. To obtain higher range resolution with a short pulse scheme, a shorter pulse width is needed. This necessitates a pulse with higher peak power in order to maintain the same pulse energy, which can be a challenge if the peak power limits of a pulsed laser source have been reached. An advantage of the pulse compression approach for a laser radar system, as described herein, is that the range resolution is determined by the waveform bandwidth, not the pulse width. Therefore, the range resolution can be improved by increasing the waveform bandwidth without changing the peak power or pulse energy.

Embodiments of the present invention provide a method for passband processing of wideband optical signals to create imaging in degraded visual environments. The method of the present invention provides signal processing that provides a means to create high contrast and high resolution images.

In the following detailed description, reference is made to the accompanying drawings which are a part of this patent disclosure, and are shown by way of illustration depicting specific embodiments in which the invention, as claimed, may be practiced. The invention may, however, be embodied in many different forms and should not be construed as limited to the embodiments set forth; rather, these embodiments are provided so that this disclosure will be thorough and complete, and will fully convey the scope of the invention to those skilled in the art.

Figure 1:
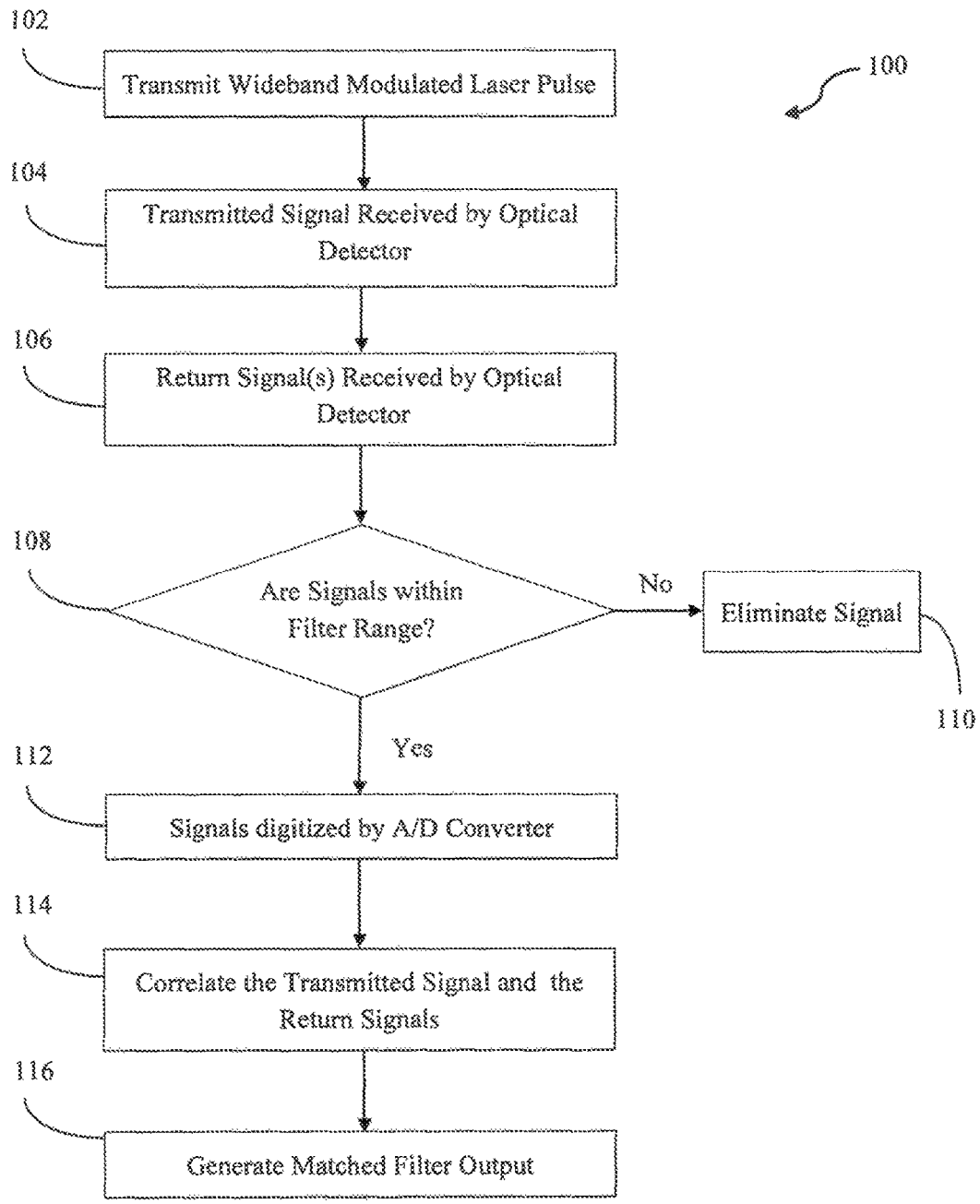
FIG. 1 is a block diagram of the process for digital passband processing in optical imaging.

Turning now to the figures, FIG. 1 is a block diagram of the process for digital passband processing in optical imaging. One skilled in the art will recognize that functions described in the block diagram may occur out of the order noted in the figures. For example, two blocks shown in succession may, if fact, be executed substantially concurrently, depending upon the functionality involved. Process 100 uses an all-digital method of laser imaging to create images of target objects. By using a combination of wideband modulated laser signals and digital passband processing, contrast and resolution of resulting images can be substantially increased.

Figure 2A:
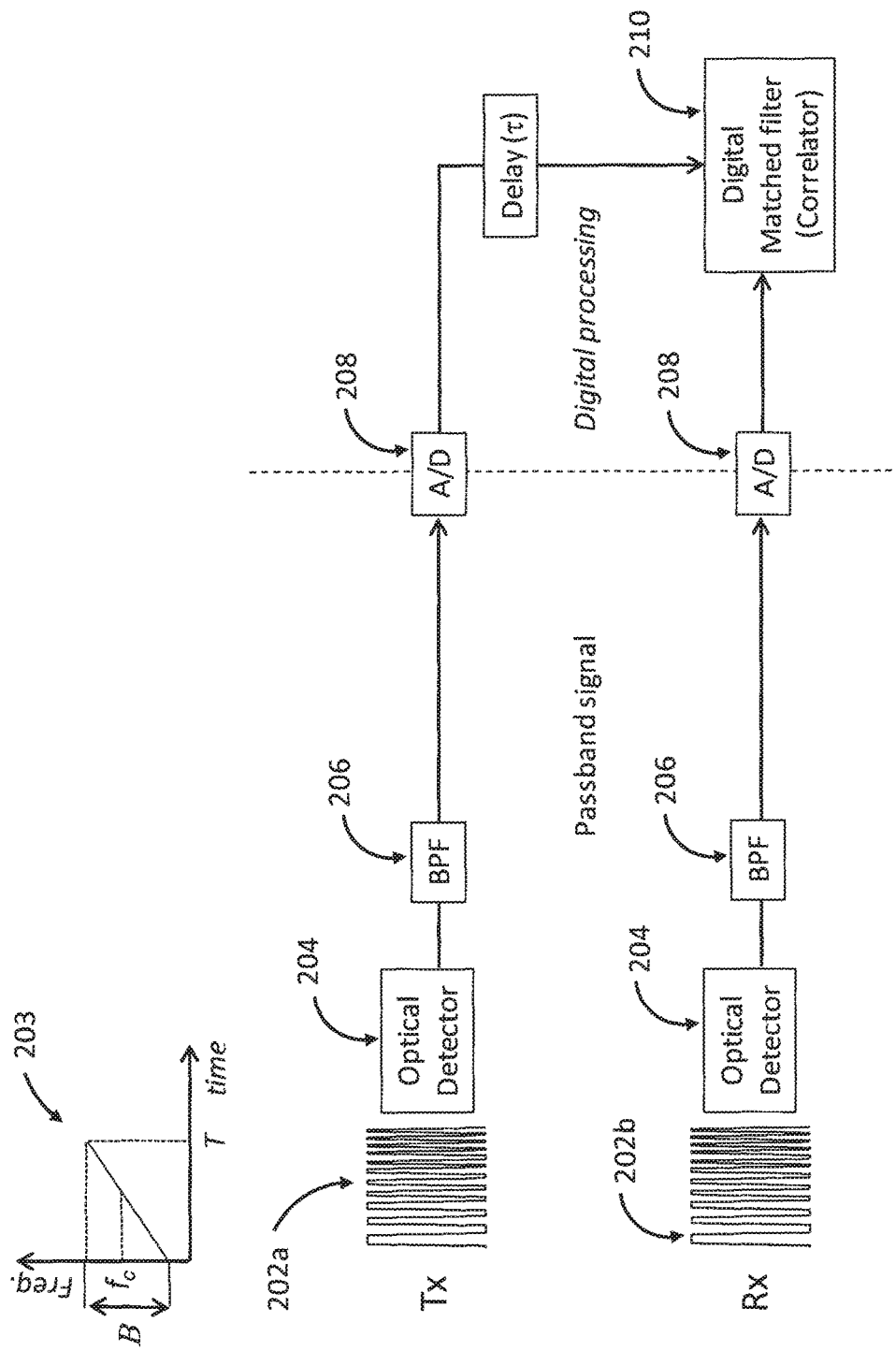
FIG. 2a is a block diagram of system used for digital passband processing on optical imaging.

In step 102, laser light is transmitted toward a target object located in the degraded visual environment. The laser light is transmitted in a wideband modulated form, or a "chirp." The signal that modulates the laser is varied as a function of time to increase the overall signal bandwidth. A representation of the wideband modulated signal is shown in FIG. 2a by signals 202a and 203, as described below.

In step 104, the transmitted signal is received by an optical detector to serve as a reference signal. The laser signal transmitted by the laser in step 102 is detected by the optical detector, which registers the chirp modulation pattern of the transmitted signal. In step 106, one or more return signals are received by a second optical detector. In some embodiments, one or more of the return signals is a result of backscatter. One or more of the return signals is a reflection off the target object located within the degraded visual environment. In some embodiments, one or more of the return signals is forward scatter light reflected off a secondary object in the degraded visual environment. For example, forward scatter can reflect off the bottom of the degraded visual environment, a secondary object in the environment, or a portion of the target object not intended to be imaged.

In decision 108, the reference signal and the received signals are analyzed to determine whether they are within a bandpass filter range. By subjecting both the transmitted and received signals to bandpass processing, a significant portion of the backscatter can be removed from the received signal. Signals that are determined to be inside the bandpass filter range are digitized using an analog-digital (A/D) converter (step 112). Signals that are determined to be outside the bandpass filter range are eliminated and not analyzed any further (step 110). The signals outside the bandpass range are representative of backscatter, which hinders optical imaging. In some embodiments, the optical detector may be gated to minimize the backscatter In some embodiments, the bandpass filtering is performed digitally after signals are digitized. For example, the signals are detected, digitized, and then bandpass filtered. In some embodiments, the advantage of performing the bandpass filtering after digitization is that the bandpass specification can be changed to match the transmitted waveform.

In step 114, an analytic signal is calculated by cross-correlating the reference signal and the received signal. The signal cross-correlation accounts for the delayed return in the transmitted signal.

In step 116, a matched filter output is generated. In some embodiments, the matched filter output comprises a narrow center peak that is a result of the correlation of the transmitted modulated signal and the received modulated signal. Target object range can be determined by analyzing the maximum peak of the matched filter output. The target object range is determined by the timing of the center of the maximum peak. The benefit of passband processing for wideband modulation schemes is that the center peak width is determined by the modulation center frequency. As a result, the output has a narrow peak width that can be used to determine range. In some embodiments, process 100 results in a narrow peak width, yielding a more accurate range than that which is produced by the baseband processing and resulting sinc envelope. Another advantage is that since this center peak width is inversely proportional to the center frequency, it will not undergo the 'pulse stretching' that a conventional short pulse would experience due to multiple small angle scattering. Thus, the range resolution and accuracy is maintained even in highly degraded visual environments.

FIG. 2a is a block diagram of the process for digital passband processing in optical imaging. Digital passband processing system includes multiple components, including: optical detector 204, bandpass filter 206, digitizer 208, and digital matched filter 210.

Optical detector 204 receives inputs including a transmitted, reference signal 202a and received signal 202b. The reference signal 202a represents the modulated laser pulse emitted from the system's laser. Graph 203 shows how the modulation frequency of the transmission signal changes with respect to time. The bandwidth and the center frequency of the modulation on the transmitted signal can be modified. The modification of either the bandwidth or the center frequency of the modulation can be used to tune the system, as there is a relationship between the bandwidth to center frequency ratio and matched filter peak width. Received signal 202b represents the modulated signal received as a result of the transmitted signal being reflected off the target object. Embodiments of the present invention utilize wideband modulated signals to minimize the forward scatter of a signal.

Bandpass filter 206 uses a predetermined modulation frequency range to minimize the amount of backscatter present in the return signal. The transmitted modulation bandwidth and frequency range are known quantities. Further, the change in frequency due to the properties of light in the environment is known. Therefore, an estimated modulation bandwidth and frequency range for the return signal can be determined. This range is used to filter out light that never reached the target object due to light scatter in the degraded visual environment.

Figure 2B:
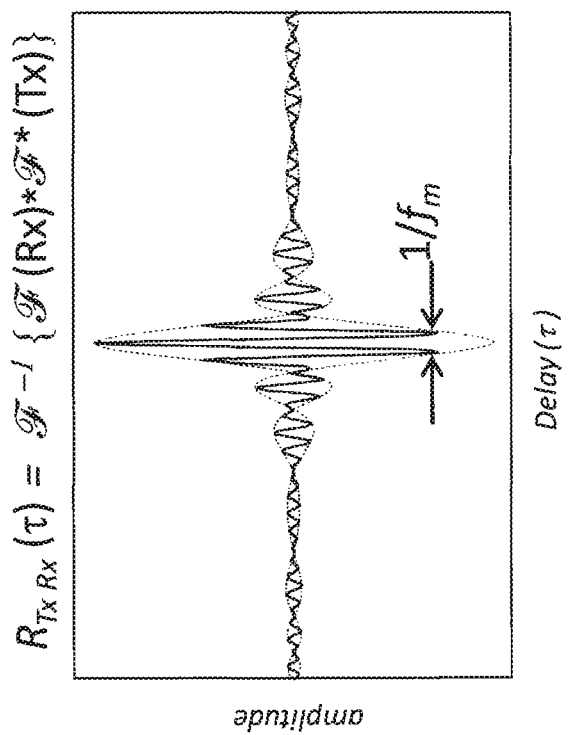
FIG. 2b is an illustration of an output of the digital passband processing system, illustrating a resulting digital passband processed signal.

Digitizer 208 converts the analog signals, both the transmitted and received signals, into digital signals. Digital matched filter 210 correlates the digital received signal with the digital transmitted signal. The correlation matches the modulation pattern of the two signals, from which an output, such as the graph shown in FIG. 2b, is created. The range of the target object can be determined based on the location of the maximum peak in the matched filter output.

FIG. 2b is an illustration of a sample output of a digitally processed passband signal. The width of the maximum peak is inversely proportional to the center frequency of the modulation. The width of the maximum peak, as shown in the sample output, can be used to determine the range of the target object.

Figure 3:
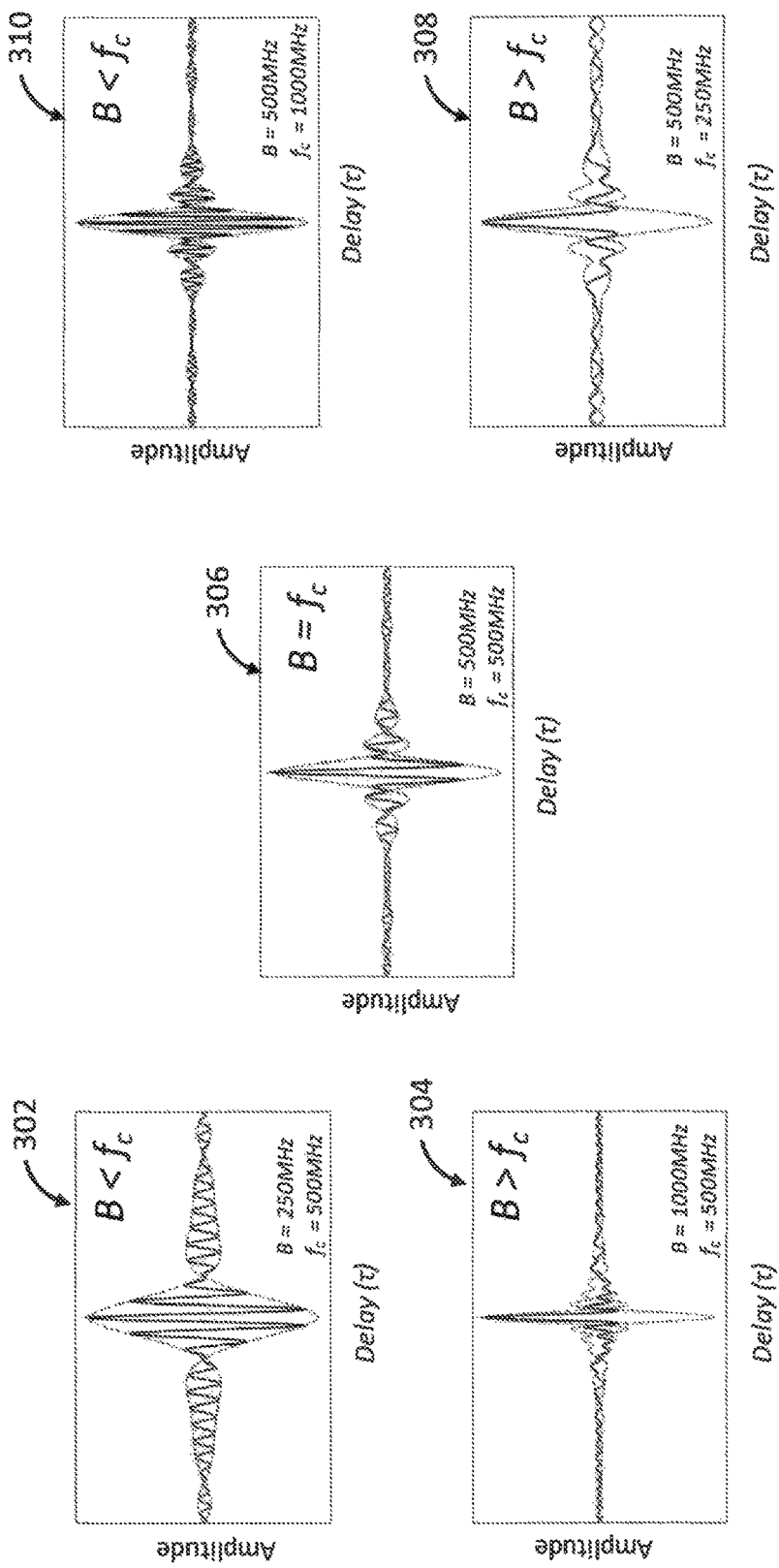
FIG. 3 is an illustration of multiple outputs of the digital passband processing system, illustrating the effects of a bandwidth to center frequency ratio.

FIG. 3 is an illustration of the effects of a bandwidth to center frequency ratio. The 'sidelobes' of the passband correlation function can be controlled through proper choice of the bandwidth to center frequency ratio ($B/f_c$). When the bandwidth is less than the center frequency ($B<f_c$) as in diagram 302, there are more cycles of modulation within the baseband sine envelope, and the positive sidelobe levels are high. In some embodiments, it may be difficult to distinguish between the maximum peak and the sidelobes when sidelobe levels are high. For the same carrier frequency, when the bandwidth is increased so that it is greater than the center frequency ($B>f_c$), as in diagram 304, only one positive peak of the center frequency exists within the matched filter output and the sidelobes are reduced. Similarly, for the same bandwidth, the positive sidelobe levels are reduced when the carrier frequency is lower than the bandwidth, as in diagram 308. For the case where the bandwidth is equal to the carrier frequency ($B=f_c$), as in diagram 306, the positive sidelobe levels are lower than those in the $B<f_c$ scenario (diagram 302 and diagram 310) and higher than those in the $B>f_c$ scenario (diagram 304 and diagram 308). This tradeoff of sidelobe levels with the value of $B/f_c$ must also consider where the modulation frequency band occurs relative to backscatter and forward scatter rejection, both of which improve as the modulation frequency increases. The benefit of this passband processing with wideband modulation schemes is that the correlation peak width is now determined by both the modulation center frequency and the bandwidth, which can be tuned based on the conditions of the environment surrounding the target object.

The above description is that of current embodiments of the invention. Various alterations and changes can be made without departing from the spirit and broader aspects of the invention as defined in the appended claims.

What is claimed is:

1. A method of imaging in degraded visual environments, wherein the method comprises:
    transmitting a wideband modulated laser pulse from a first location through a medium toward a target object at a second location;
    detecting a reference input of the transmitted wideband modulated laser pulse by an optical receiver;
    detecting a target modulated laser pulse reflected from the target object by the optical detector;
    filtering the target modulated laser pulse and the reference input with a bandpass filter, based on a predetermined modulated frequency range;
    digitizing the filtered target modulated laser pulse and the reference input with an analog-digital converter;
    correlating the filtered target modulated laser pulse and the filtered reference input with a digital matched filter, wherein the digital matched filter produces a passband matched filter output; and
    determining a range of the target object based on the matched filter output.

2. The method of claim 1, wherein the transmitted wideband laser pulse is in a blue-green light spectrum.

3. The method of claim 1, wherein the wideband modulated laser pulse comprises a defined bandwidth and a defined center frequency.

4. The method of claim 3, further comprising:
    modifying the defined bandwidth of the wideband modulated laser pulse, wherein modifying a ratio of bandwidth to center frequency tunes the determined range.

5. The method of claim 3, further comprising:
    modifying the center frequency of the wideband modulated laser pulse, wherein modifying a ratio of bandwidth to center frequency tunes the determined range.

6. A system for imaging in degraded visual environments, the system comprising:
    a laser, positioned to transmit a wideband modulated pulse toward a target object located within a degraded visual environment;
    an optical receiver, positioned to receive one or more return pulses;
    a bandpass filter, wherein the bandpass filter rejects a portion of the one or more return pulses outside a threshold modulated frequency range;
    an analog-digital converter, wherein the wideband modulated pulse and the one or more return pulses are converted to a plurality of digital signals; and
    a digital matched filter arranged to receive the plurality of digital signals.

7. The system of claim 6, wherein the optical receiver receives an input from the laser comprising a signal of the wideband modulated pulse.

8. The system of claim 6, wherein the digital matched filter correlates the wideband modulated pulse and the one or more return pulses to produce a matched filter output.

9. The system of claim 6, wherein the digital matched filter determines a range of the target object based on the matched filter output.

* * * * *